US005279120A

United States Patent [19]

Sasaki

[11] Patent Number: 5,279,120

[45] Date of Patent: Jan. 18, 1994

[54] HYDRAULIC STRIKING DEVICE

[75] Inventor: Hiroshi Sasaki, Shizuoka, Japan

[73] Assignee: Maruzen Kogyo Company Limited, Mishima, Japan

[21] Appl. No.: 921,297

[22] Filed: Jul. 28, 1992

[30] Foreign Application Priority Data

| | | | |
|---|---|---|---|
| Aug. 8, 1991 | [JP] | Japan | 3-222370 |
| Jun. 22, 1992 | [JP] | Japan | 4-185730 |

[51] Int. Cl.[5] .......................... F16D 31/02; B25D 9/00

[52] U.S. Cl. ...................................... 60/413; 173/135; 173/208

[58] Field of Search ................. 91/265, 271, 272, 321, 91/327; 60/413; 173/208, 206, 207, 135

[56] References Cited

U.S. PATENT DOCUMENTS

| | | | |
|---|---|---|---|
| 1,604,011 | 10/1926 | Zimmermann | 173/207 |
| 1,629,117 | 5/1927 | Penberthy | 173/208 |
| 3,608,650 | 9/1971 | Matsusaka | 173/207 X |
| 4,181,183 | 1/1980 | Okada | 173/208 X |
| 4,444,274 | 4/1984 | Suwabe | 173/134 |
| 4,658,913 | 4/1987 | Yantsen et al. | 173/208 X |
| 4,784,228 | 11/1988 | Ito | 173/208 X |
| 5,064,005 | 11/1991 | Krone | 173/208 X |

FOREIGN PATENT DOCUMENTS 1333603 11/1985 Japan .

*Primary Examiner*—Edward K. Look
*Assistant Examiner*—Hoang Nguyen
*Attorney, Agent, or Firm*—Nields & Lemack

[57] ABSTRACT

A hydraulic striking device requiring no complicated adjustment of the flow rate of hydraulic fluid from the hydraulic pressure source of a hydraulic construction machine, etc. and operable by utilizing the power unit of a variety of such hydraulic machines. The adjusting valve (8) is disposed inside the main body near the control valve (5) and used to restrict the flow of hydraulic fluid ejected from the upper piston chamber (16) and passed through the control valve (5) with respect to the pressure of the hydraulic fluid supplied into the upper chamber (12) before flown from the outlet (11) to control the pressure in the upper piston chamber (16). Thus, a nearly constant, appropriate operating pressure can automatically be maintained irrespectively of the flow rate of the hydraulic fluid supplied from outside.

7 Claims, 11 Drawing Sheets

HYDRAULIC STRIKING DEVICE

FIELD OF THE INVENTION

The present invention relates to a hydraulic striking device, and more particularly, to a hydraulic striking device adapted to be operable with a hydraulic pressure supplied from a hydraulic pressure source provided in a hydraulic construction machine, etc.

BACKGROUND OF THE INVENTION

Because of its low noise and high energy efficiency, the hydraulic striking device is widely used for the jobs of destruction and crushing in construction, reconstruction or repairing of roads, buildings, etc. As known from the disclosure in, for example, the Japanese Examined Patent Application No. 52914/1985 (Kokoku) and U.S. Pat. No. 4,444,274, the hydraulic striking device comprises a slidable piston which is reciprocated under the hydraulic pressure to drive or hammer a tool such as chisel or the like.

The hydraulic striking device of such conventional type is operated as fed from a dedicated hydraulic pressure source or a socalled hydraulic unit. However, use of such a dedicated hydraulic unit will unavoidably cause the equipment cost, installation space, running cost, etc. to increase. To avoid such disadvantages, it has been proposed to operate the hydraulic striking device with a hydraulic pressure supplied from the hydraulic unit incorporated as standard component in a hydraulically driven machine, for example, hydraulic construction machine such as power shovel, bulldozer, wheeled loader, hydraulic crane truck or the like.

Since this system requires no dedicated hydraulic pressure source, the hydraulic striking device can be used in a wider industrial application. Also the hydraulic unit of a hydraulic construction machine can be effectively utilized as the power source of the device, and thus a civil engineering or construction work as a whole can be done more efficiently with such a hydraulic striking device.

However, the hydraulic construction machines vary in design very much from one to another, and accordingly the powers they supply also vary in pressure and flow rate significantly from one to another. On the other hand, as the flow rate of a hydraulic fluid supplied from the hydraulic pressure source to the hydraulic striking device varies, the operating pressure (pressure per unit area for driving the hammer piston) varies correspondingly. That is, a higher flow rate of the hydraulic fluid supplied from the hydraulic pressure source leads to an increased operating pressure, while a lower hydraulic fluid flow rate causes a decreased operating pressure.

Further, the impact given to a tool by the downstroke piston of the hydraulic striking device is generally proportional to the operating pressure. Therefore, the operating pressure must be kept at a certain level when crushing a concrete or the like. Namely, if the operating pressure is too low, the impact given to the tool is also too low for the device to perform the function of striking. On the contrary, if the operating pressure is too high, the impact given to the tool becomes excessively large, causing the device parts to be heavily abraded or causing an excessively large vibration, which will make it difficult to handle the hydraulic striking device or eventually cause a great danger. That is, simple connection of the hydraulic pressure from the hydraulic pressure source of a hydraulic construction machine to the hydraulic striking device will not permit the device to work well and stably.

For a good and stable operation of the hydraulic striking device, it has been proposed to use the controller of the hydraulic pressure source or hydraulic unit of a hydraulic construction machine to limit the flow rate of the hydraulic fluid supplied to the hydraulic striking device to a certain range (for example, 20 to 25 liters/-min). However, this method necessitates it to adjust the discharge rate at the hydraulic construction machine side each time when the hydraulic striking device is used with the machine. Such adjustment is very complicated and also takes much labor and time. Moreover, to use the construction machine for another job (its original function) after combined use with the hydraulic striking device, the controls and valves must be readjusted for the hydraulic pressure to match the working capacity of the construction machine. This is also troublesome. Neglecting of the discharge rate adjustment and inappropriate readjustment have frequently used to cause the failure of the hydraulic striking device.

SUMMARY OF THE INVENTION

The present invention has an object to overcome the above-mentioned drawbacks of the prior art by providing a highly practical hydraulic striking device which can automatically maintain the operating pressure always at a nearly constant level whatever the flow rate of hydraulic fluid supplied from outside is and however the hydraulic fluid flow rate varies.

The present invention has also an object to implement the above-mentioned function with a relatively simple structure.

The above objects can be attained by providing, according to the present invention, a hydraulic striking device comprising a main body having disposed coaxially therein a tool, a hammer piston which drives the tool and a control valve which selects a flow passage of hydraulic fluid to the hammer piston, and having the following structural features:

i. The main body has above the control valve an upper chamber which always communicates with a hydraulic pressure inlet and a lower piston chamber in which the lower pressure receiving face of the hammer piston stays, through a passage.
ii. There is provided between the upper chamber and lower piston chamber an upper piston chamber in which the upper pressure receiving face of the hammer piston always stays and which communicates with the upper chamber through a passage when the valve body of the control valve goes down.
iii. There is disposed near the control valve an operating pressure adjusting valve which restricts the flow of hydraulic fluid to the outlet through the passage from the upper piston chamber correspondingly to the pressure of the hydraulic fluid coming into the upper chamber, thereby controlling the pressure in the upper piston chamber.

Because of the above-mentioned structural features adopted in the present invention, the hydraulic unit of a hydraulic construction machine can be utilized, without the necessity of any complicated adjustment of hydraulic fluid flow rate, to operate the hydraulic striking device.

More specifically, the adjusting valve is provided with a valve hole formed in a position where it intersects both an inlet passage for communication between the inlet and upper chamber and an outlet passage communicating the outlet and the low pressure chamber of the control valve with each other, a valve body slidably disposed in the valve hole, a spring which forces up the valve body, and a plunger which conveys the pressure of the hydraulic fluid passed through the inlet passage to the valve body which is thus forced down against the action of the spring. Further, the valve hole has a ring-like control chamber into which the hydraulic fluid is led from the upper piston chamber, and the valve body is provided with a flow restrictor in a position corresponding to the control chamber.

The above-mentioned adjusting valve may be either of a type which restricts the flow of the hydraulic fluid led from the passage into the valve hole, or of a type which restricts the flow of the hydraulic fluid discharged from the valve hole to the outlet passage.

The adjusting valve of the former type has a structure as follows. The control chamber is provided in the middle of the valve hole depth. The valve body has a vertical hole formed in the axial direction thereof, and is provided along the outer circumference thereof with a rod section extending from a valve hole portion above the control chamber to inside the control chamber and which has a hole communicating with the vertical hole. A flow restrictor is located at the lower end of the rod section to variably restrict the amount of the fluid flowing into the valve hole portion from the control chamber as the valve body is changed in position.

The adjusting valve of the latter type is constructed as follows. The control chamber is provided in the middle of the valve hole depth. This control chamber is communicated with the outlet through the outlet passage and another passage. The valve hole above the control chamber always communicates with a liaison hole of which the communication with the upper piston chamber is switched according to the changeover operation of the control valve.

The valve body has a rod section extending from a valve hole portion to the control chamber. A flow restrictor is located at the lower end of the rod section to variably restrict the amount of the fluid flowing from the valve hole into the control chamber as the valve body is changed in position.

DETAILED DESCRIPTION OF THE PREFERRED EMBODIMENTS

FIGS. 1 to 6 show the first embodiment of the hydraulic striking device according to the present invention, and FIGS. 7 to 11 show the second embodiment thereof.

Figure 1:
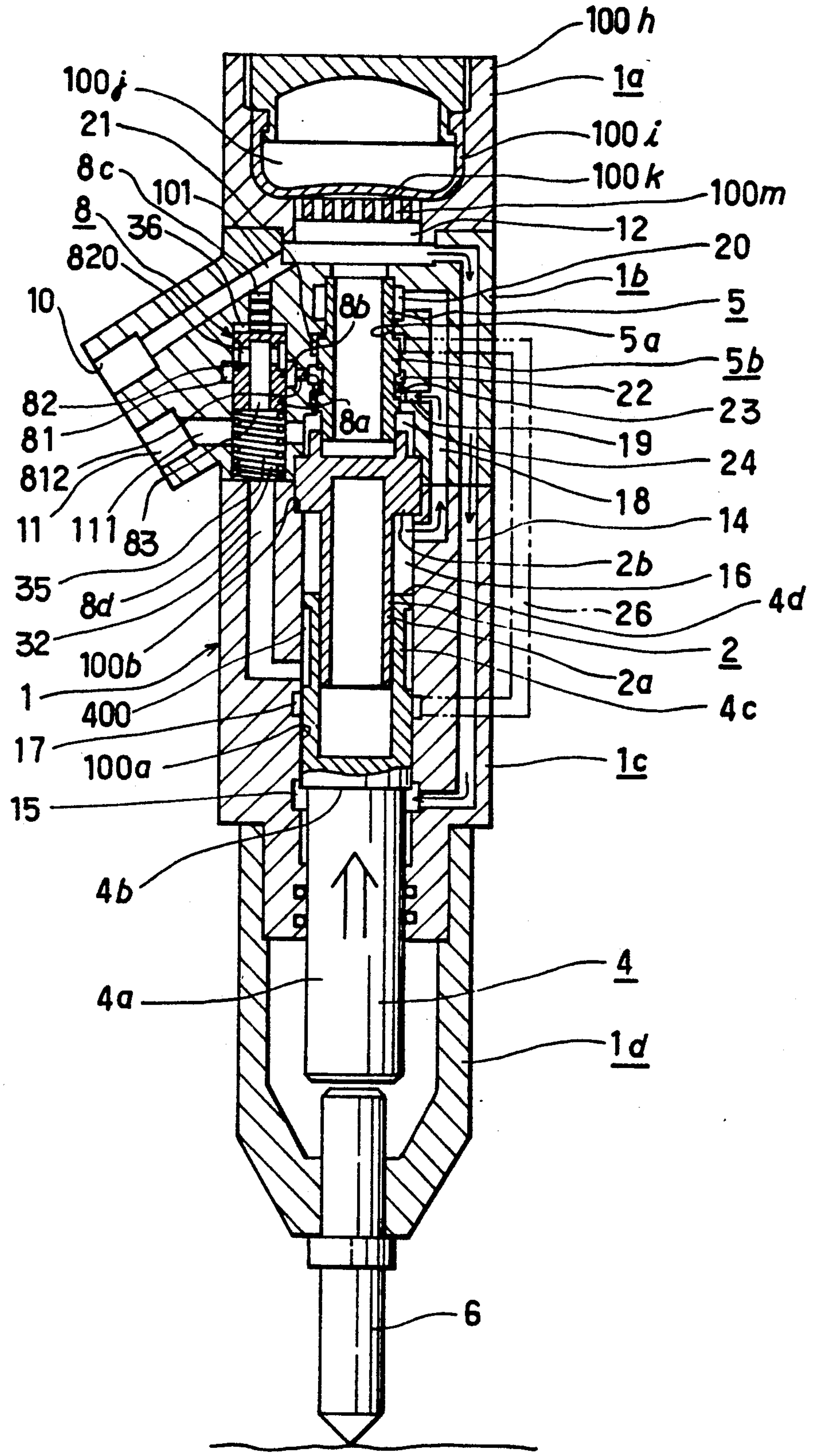
FIG. 1 is a sectional view of a first embodiment of the hydraulic striking device according to the present invention, showing the rise start of the hammer piston after completion of a striking.
Figure 2:
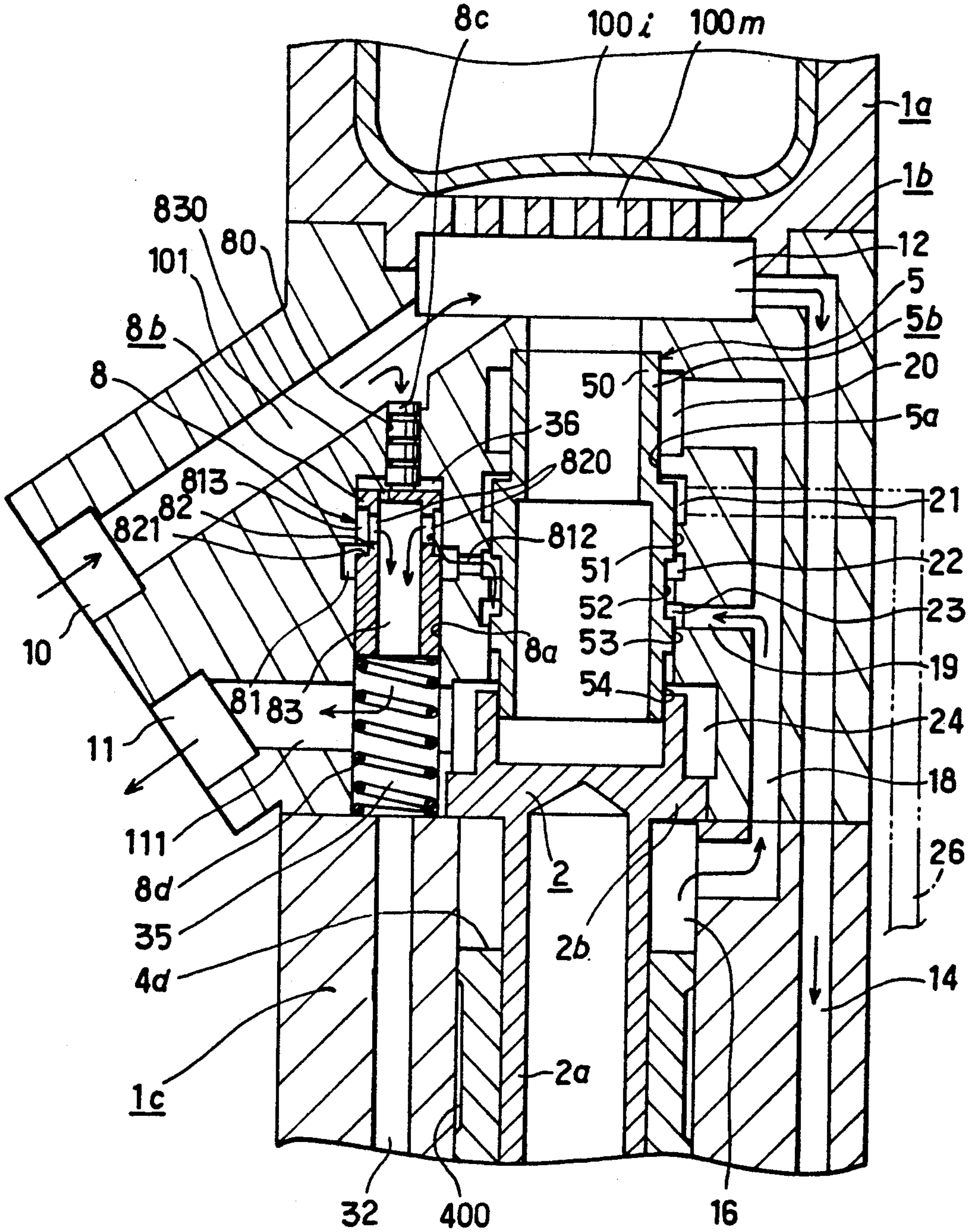
FIG. 2 shows the valve section in FIG. 1, as enlarged in scale.
Figure 3:
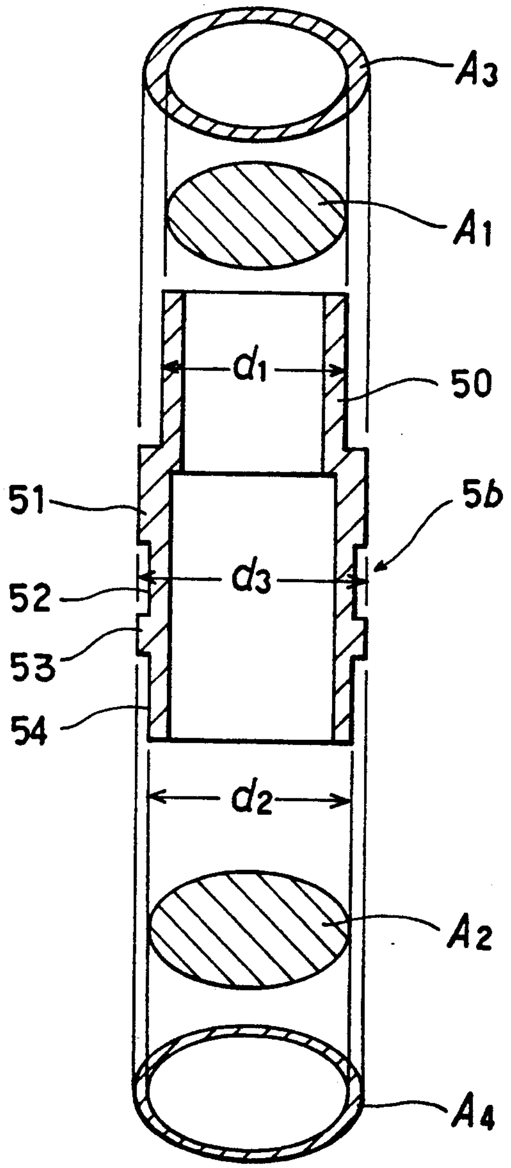
FIG. 3 is an explanatory drawing showing the relation between diameters and areas of the parts of the control valve body according to the present invention.
Figure 7:
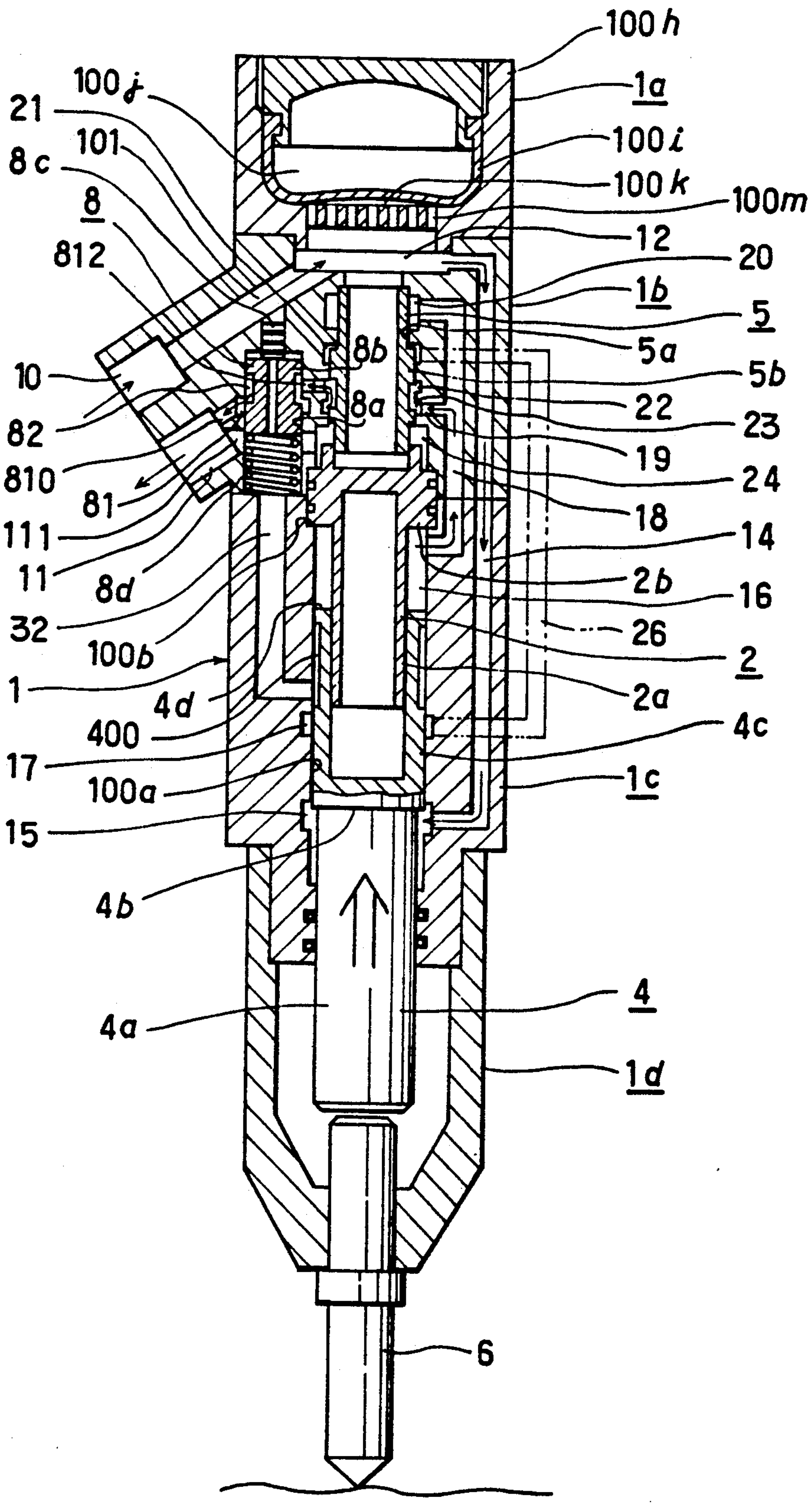
FIG. 7 is a sectional view of a second embodiment of the hydraulic striking device according to the present invention, showing the rise start of the hammer piston after completion of a striking.
Figure 8:
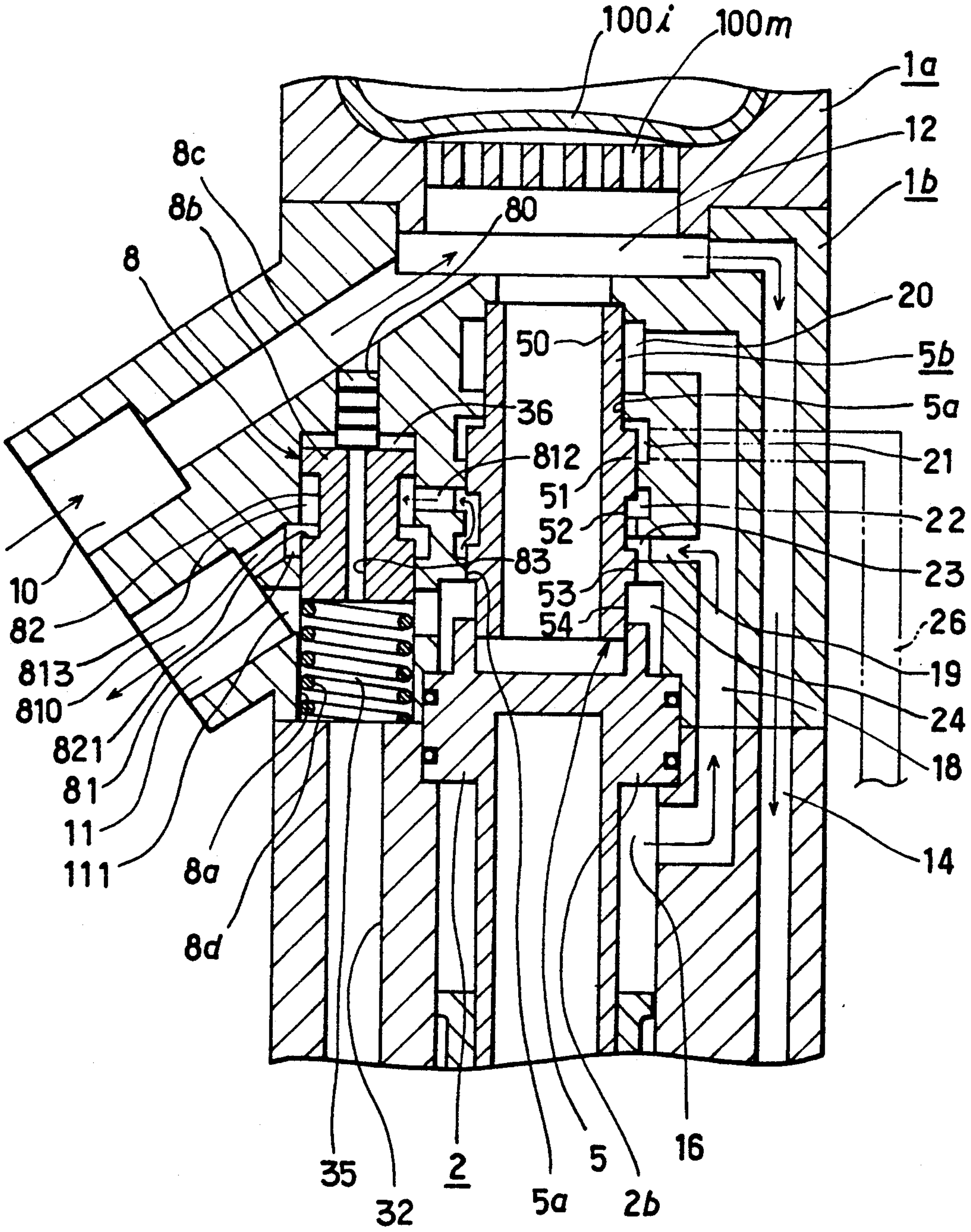
FIG. 8 shows the valve section in FIG. 7, as enlarged in scale.

FIGS. 1 and 7 show the positions, respectively, of the hammer piston having just started rising after completion of a striking. FIGS. 2 and 8 show the valve sections, respectively, of the device as enlarged in scale. FIG. 3 shows the relation between the diameter and sectional area of the control valve.

Referring now to FIGS. 1 and 7, the reference numeral 1 indicates a main body having an accumulator 1*a*, a valve body 1*b*, a cylinder 1*c* and a front end 1*d*, connected together by means of bolts (not shown). The valve body 1*b* or the accumulator 1*a* is provided with an operating handle (not shown).

The front end 1*d* is cylindrical, and has a central hole in which a tool 6 such as chisel is slidably mountable. The step of the front end section of the cylinder 1*c* is fitted in the upper end of the front end 1*d*, and the cylinder 1*c* has formed a through-hole 100*a* axially in the center thereof.

The through-hole 100*a* has slidably fitted therein a hammer piston 4 which has a rod section 4*a* extending through the through-hole 100*a* to inside the front end 1*d* and a piston section 4*c* having a larger diameter than the rod section. There is formed at the boundary between the rod and piston sections 4*a* and 4*c* a ring-like lower face 4*b* for receiving the pressure. The piston section 4*c* has formed therein a blind hole open at the upper end thereof and having a required depth. Thus, the piston section 4*c* has formed at the top thereof a ring-like upper face 4*d* for receiving the pressure. There is provided a ring-like wide recess 400 along the outer circumference below the upper pressure receiving face 4*d*.

The through-hole 100*a* has provided at the upper end thereof a step 100*b* on which the head 2*b* of a sealing member 2 is fitted. The sealing member 2 has a guide shaft 2*a* coaxial with the through-hole 100*a*, and the guide shaft 2*a* is fitted in the blind hole in the piston section 4*c*. Thus, there is defined a ring-like upper piston chamber 16 between the upper pressure receiving face 4*d* and the head 2*b* of the sealing member 2. The capacity of the upper piston chamber 16 varies as the hammer piston 4 slides.

The through-hole 100*a* has formed therein a ring-like lower piston chamber 15 to have the hydraulic pressure act on the lower pressure receiving face 4*b* of the hammer piston 4 at its lower limit of stroke. Further, the through-hole 100*a* has formed therein above the lower piston chamber 15 an intermediate piston chamber 17 defined by a ring-like recess and which is located so as to communicate with the ring-like recess 400 at the end of falling stroke of the hammer piston 4.

Next, the valve body 1*b* has an upper chamber 12 formed therein at the upper portion thereof, and also is provided with an inlet 10 and an outlet 11 at one lateral side thereof. The upper chamber 12 communicates with the accumulator 1*a*. The inlet 10 is communicated at the front end thereof with the upper chamber 12 through an inlet passage 101, and connected at the rear end thereof to the outlet of a hydraulic unit of a hydraulic construction machine by means of a hose (not shown). The upper end of a first passage 14 is connected to a portion of the upper chamber 12 different from the connection of the inlet passage 101. The first passage 14 extends through the valve body 1*b* to the cylinder 1*c* and is communicated at the low end thereof with the lower piston chamber 15.

The outlet 11 is communicated at the front end thereof with a low pressure chamber 24 of a control valve 5 which will be further described later, and at the rear end thereof with an oil or hydraulic fluid reservoir of a hydraulic unit of the hydraulic construction machine by means of a hose (not shown).

The accumulator 1*a* has extended in a space defined by a shell and a chamber 100*h* a diaphragm 100*i* which separates the space into a gas chamber 100*j* and an accumulation chamber 100*k*. The accumulation chamber 100*k* and the upper chamber 12 are communicated with each other through a small hole 100*m*.

The valve body 1*b* has built therein coaxially with the sealing member 2 the control valve 5 which switches the flow of hydraulic fluid to the hammer piston 4.

The control valve 5 has a valve hole 5*a* of which the bottom is the head 2*b* of the sealing member 2, and a cylindrical valve body 5*b* slidably fitted in the valve hole 5*a* and which can go down until it abuts the head 2*b* of the sealing member 2.

As shown in FIGS. 2, 3 and 8, the valve body 5*b* is composed of a first rod section 50, first land section 51, second rod section 52, second land section 53 and third rod section 54 in this order from above. Assume here that the outside diameter of the first rod section 50 is d1, that of the second rod section 52 is d3, that of the third rod section 54 is d2, sectional area of the first rod section 50 is A1, that of the third rod section 54 is A2, that of the first land section 51 is A3 and that of the second land section 53 is A4 as shown in FIG. 3. These parameters meet the following requirements:

$$d3 > d2 > d1$$

$$A2 > A1 \quad (1)$$

$$A3 > A4 \quad (2)$$

$$A1 + A3 = A2 + A4 \quad (3)$$

$$A1 - A2 + A3 = A4 \quad (31)$$

$$A3 - A4 = A2 - A1 \quad (32)$$

On the other hand, the valve hole 5*a* has formed therein below the hole communicating with the upper chamber 12 a first valve chamber 20, a second valve chamber 21, a third valve chamber 22, a fourth valve chamber 23 and a low pressure chamber 24 in this order as spaced from each other.

The first valve chamber 20 is located in an area corresponding to the first rod section 50 of the valve body 5*b*. When the valve body 5*b* is at the upper limit of stroke, the communication of the first valve chamber 20 with the upper chamber 12 is interrupted. A second passage 18 is connected at the upper end thereof to the first valve chamber 20. The second passage 18 extends from the valve body 1*b* to the cylinder 1*c* and is connected at the lower end thereof to the upper piston chamber 16.

The second valve chamber 21 is located in an area where the first land section 51 always stays, and it is connected to the intermediate piston chamber 17 through a third passage 26. This third passage 26 is illustrated like an external passage in the drawings, but it is actually an internal passage extending from the valve body 1*b* to the cylinder 1*c*. The third passage 26 is located in a sectional plane different from those in which the first passage 14 and second passage 18 lie.

The third valve chamber 22 is located so that it is opened by the second rod section 52 when the valve body 5*b* is at the upper limit of stroke while it is closed by the first land section 51 when the valve body 5*b* is at the lower limit.

When the valve body 5*b* is at the upper limit of stroke, the second rod section 52 goes into the fourth valve chamber 23, and therefore the fourth valve chamber 23 communicates with the third valve chamber 22. However, when the valve body 5*b* falls, the third valve chamber 22 is closed by the first land section 51 as mentioned above and its communication with the third valve chamber 22 is thus interrupted. The fourth valve chamber 23 is connected to the second passage 18 through a shunt passage 19.

The low pressure chamber 24 is located at the bottom of the valve hole so as to surround the third rod section 54, and its communication with the fourth valve chamber 23 is interrupted by the second land section 53 wherever the valve body 5*b* is positioned.

The present invention is most significantly characterized in that the adjusting valve 8 is located so as to be parallel to the control valve 5 and to intersect the inlet passage 101 and the outlet passage 111 and it is used to control the pressure in the upper piston chamber 16, thereby controlling the pressure in the lower piston chamber 15.

In both the first and second embodiments of the present invention, the adjusting valve 8 has a valve hole 8*a* formed axially from the bottom of the valve body 1*c*, a valve body 8*b* slidably fitted in the valve hole 8*a*, a plunger 8*c* disposed atop the valve body 8*b*, and a spring 8*d* disposed on the bottom of the valve hole 8*a* and which supports the valve body 8*b*.

The valve hole 8*a* takes the form of a upward-directed blind hole and has a smaller-diameter through-hole 80 directed toward the inlet passage 101 from the ceiling thereof and in which the plunger 8*c* is slidably fitted. The setting load of the spring 8*c* is so weak that the top of the valve body 8*b* does not touch the ceiling of the valve hole 8*a*. Hence, there are always defined an upper chamber 36 between the top of the valve body 8*b* and the ceiling of the valve hole 8*a*, and a lower chamber 35 between the bottom of the valve body 8*b* and the bottom of the valve hole 8*a* (top end face of the cylinder 1*c*). The outlet passage 111 intersects the lower chamber 35 as mentioned above, and always communicates with the low pressure chamber 24.

As seen from FIGS. 1 and 7, a fourth passage 32 formed in the cylinder 1*c* is connected at the upper end thereof to the bottom of the lower chamber 35, and at the lower end thereof to the through-hole 100*a* at a predetermined position. More particularly, the fourth passage 32 is opened at the lower end thereof in a position where it can be communicated with the intermediate piston chamber 17 through the ring-like recess 400 when the hammer piston 4 moves.

In the first embodiment, the valve hole 8*a* has a ring-like control chamber 81 in the middle of the depth thereof as shown in FIG. 2. The control chamber 81 communicates with a liaison hole 812 extending radially from the third valve chamber 22.

The valve body 8*b* has formed in the center thereof a vertical hole 83 which communicates with the lower chamber 35 and also with the upper chamber 36 through at least one hole 830 formed in the ceiling wall of the valve body 8*b*, so that the upper chamber 36 and the lower chamber 35 are always kept at a same pressure.

Furthermore, the valve body 8*b* has formed on the outer circumference thereof a rod section 82 for a land section to remain above it. The rod section 82 is provided with a plurality of holes 820 for communication between the vertical hole 83 and outside. The lower end 821 of the rod section 82 is always located inside the control chamber 81, and it is so dimensioned as not to close the control chamber 81 even when the valve body 8*b* is at the upper limit of stroke.

Therefore, according to the first embodiment, a permanent communication is provided between the control chamber 81 and a valve hole portion 813 above the chamber 81. As the lower end 821 of the rod section 82 changes in position when the valve body 8*b* moves up or down, the area of the opening between the control chamber 81 and the valve hole portion 813 above the chamber 81 is changed, thus variably restricting the flow of the hydraulic fluid passed into the valve hole portion 813 from the liaison hole 812.

Namely, as the valve body 8*b* rises, the lower end 821 of the rod section 82 goes nearer to the upper edge of the control chamber 81 and thus the flow of the hydraulic fluid from the control chamber 81 to the valve hole portion 813 is greatly restricted. On the contrary, when the valve body 8*b* falls, the lower end 821 of the rod section 82 goes away from the upper edge of the control chamber 81 so that the flow rate of the hydraulic fluid from the control chamber 81 to the valve hole portion 813 is less restricted.

In the first embodiment, it is the flow of the hydraulic fluid from the control chamber 81 into the valve hole portion 813 that is restricted; namely, the flow rate is controlled at the inlet side. On the other hand, according to the second embodiment, the flow of the hydraulic fluid from the valve hole portion 813 to the control chamber 81 located downstream thereof is restricted. The flow rate is controlled at the outlet side in this case.

Thus, the control chamber 81 is provided at a height below the third valve chamber 22, and the control chamber 81 is partially communicated with the outlet 11 through a passage 810 separated from the outlet 111, and the valve hole portion 813 above the control chamber 81 is communicated with the third valve chamber 22 through the liaison hole 812.

The valve body 8*b* has formed through it in the center thereof a vertical hole 83 to equalize the pressures in the upper and lower chambers 36 and 35 to each other, and also formed in the middle of the outer circumference thereof a rod section 82 of which the lower end 821 is always located in the control chamber 81. Therefore, the liaison hole 812 and the control chamber 81 are always communicated with each other so that the control chamber 81 will not be closed.

In the second embodiment, a free flow of the hydraulic fluid from the liaison hole 812 to the valve hole portion 813 is permitted. As the lower end 821 of the rod section 82 changes in position when the valve body 8*b* moves up or down, the area of the opening between the valve hole portion 813 and the control chamber 81 is changed, thus variably restricting the flow of the hydraulic fluid from the valve hole portion 813 to the control chamber 81.

The plunger 8*c* has provided on the outer circumference thereof a plurality of labyrinth recesses as regularly spaced. In the first and second embodiments, the plunger 8*c* is a part separated from the valve body 8*b*, but it may be formed integrally with the valve body 8*b*. In this case, the plunger 8*c* has formed in the base thereof a radial hole communicating with the vertical hole 83.

OPERATION

The hydraulic striking device according to the present invention functions as will be described below.

For use of the hydraulic striking device according to the present invention, a hose is used to connect the inlet 10 thereof to the outlet of a selected external hydraulic pressure source, for example, the hydraulic unit of a power shovel, and the outlet 11 is connected to the oil or hydraulic fluid reservoir of the hydraulic unit with a hose.

As seen from FIGS. 1 and 7, the hydraulic fluid supplied from the inlet 10 passes through the inlet passage 101 and flows from the upper chamber 12 into the lower piston chamber 15 via the first passage 14. Then the hammer piston 4 of which the lower pressure receiving face 4*b* stays in the lower piston chamber 15 at this time is forced up (rising stroke) under the hydraulic pressure acting on the lower pressure receiving face 4*b*. At a same time, the hydraulic fluid filled in the upper piston chamber 16 is ejected from the second passage 18 and flows into the fourth valve chamber 23 via the shunt passage 19.

At this stage, the fourth valve chamber 23 is in communication with the third valve chamber 22 as shown in FIGS. 2 and 8, so that the hydraulic oil in the upper piston chamber 16 flows into the third valve chamber 22. In the first embodiment, the third valve chamber 22 is communicated with the control chamber 81 through the liaison hole 812 and the control chamber 81 has a communication with the central vertical hole 83 through the hole 820 open at the valve hole portion 813 above the control chamber 81, as shown in FIG. 2. Thus, the hydraulic fluid having entered into the control chamber 81 is returned from the outlet 11 to the reservoir along a route including the valve hole portion 813, the hole 820, the vertical hole 83, the lower chamber 35 and the outlet passage 111 in this order.

In the second embodiment, the third valve chamber 22 is communicated with the valve hole portion 813 through the liaison passage 812 and the valve hole portion 813 communicates with the passage 810 through the control chamber 81 below the valve hole portion 813 as shown in FIG. 8. Therefore, the hydraulic fluid in the upper piston chamber 16 is returned from the outlet 11 to the reservoir along a route including the liaison passage 812, the valve hole portion 813, the control chamber 81 and the passage 813 in this order.

When the hammer piston 4 is in the course of rising, a part of the hydraulic fluid having entered from the inlet 101 into the upper chamber 12 passes through the plurality of small holes 100*m*. The gas in the gas chamber 100*j* is compressed by the diaphragm 100*i* under the pressure of the fluid, so that the hydraulic fluid is accumulated in the accumulation chamber 100*k*.

Figure 4:
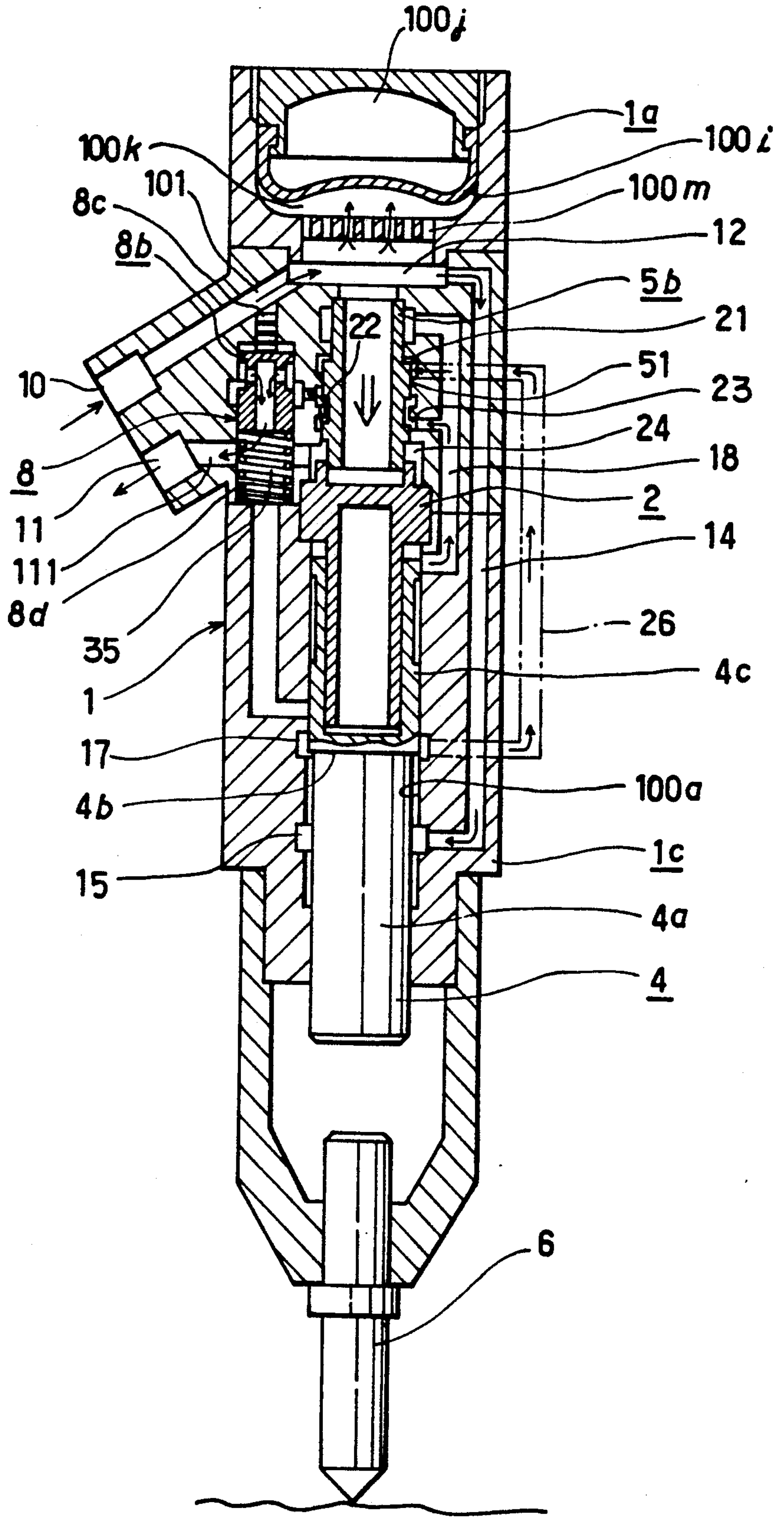
FIG. 4 is a sectional view showing the fall start of the hammer piston in the first embodiment.
Figure 9:
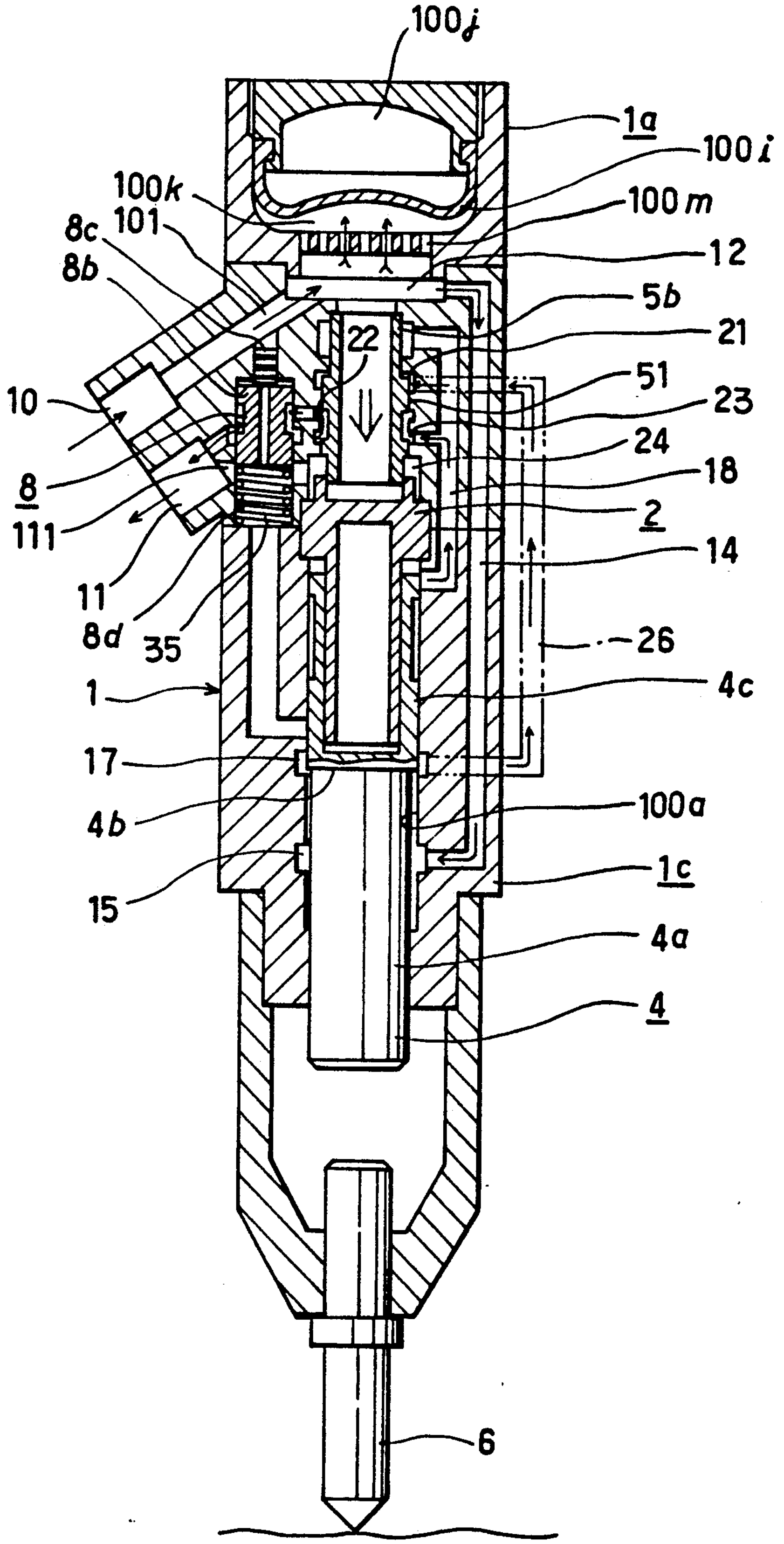
FIG. 9 is a sectional view showing the fall start of the hammer piston in the second embodiment.

As shown in FIGS. 4 and 9, when the hammer piston 4 has risen until its lower pressure receiving face 4*b* reaches the intermediate piston chamber 17, there occurs a clearance between the rod section 4*a* having a smaller diameter than that of the piston section 4*c* and the through-hole 100*a*. Thus, the hydraulic fluid under high pressure supplied from the upper chamber 12 into the lower piston chamber 15 via the first passage 14 rises up through the clearance and enters the intermediate piston chamber 17, and further flows into the second valve chamber 21 via the third passage 26.

At this time, since the upper end of the first land section 51 of the valve body 5*b* of the control valve 5 stays in the second valve chamber 21, the high pressure acts on the ring-like upper end face of the first land section 51. On the other hand, the low pressure chamber 24 at the bottom of the control valve 5 is always communicated with the outlet 11 via the outlet passage 111 crossing the lower chamber 35 of the adjusting valve 8. Therefore, the pressure in the low pressure chamber 24 is low. In this condition, a force develops which will lower the control valve 5.

More particularly, the low pressure chamber 24 has a low pressure PL, while a high pressure PH is always acting on the areas A1 and A2 of the valve body 5*b* of the control valve 5 shown in FIG. 3. When the high pressure PH acts on the second valve chamber 21 (area A3), a force FD develops which will lower the valve body 5*b*. The force FD is expressed as follows:

$$FD = PH \times A1 + PH \times A3 - PH \times A2 - PL \times A3 = PH(A1 - A2 + A3) - PL \times A4$$

By placing the equation (31) in this expression, $$FD = PH \times A4 - PL \times A4$$

$$FD = A4(PH - PL) > 0$$

Therefore, the valve body 5*b* is lowered with this force FD due to this differential pressure.

Figure 5:
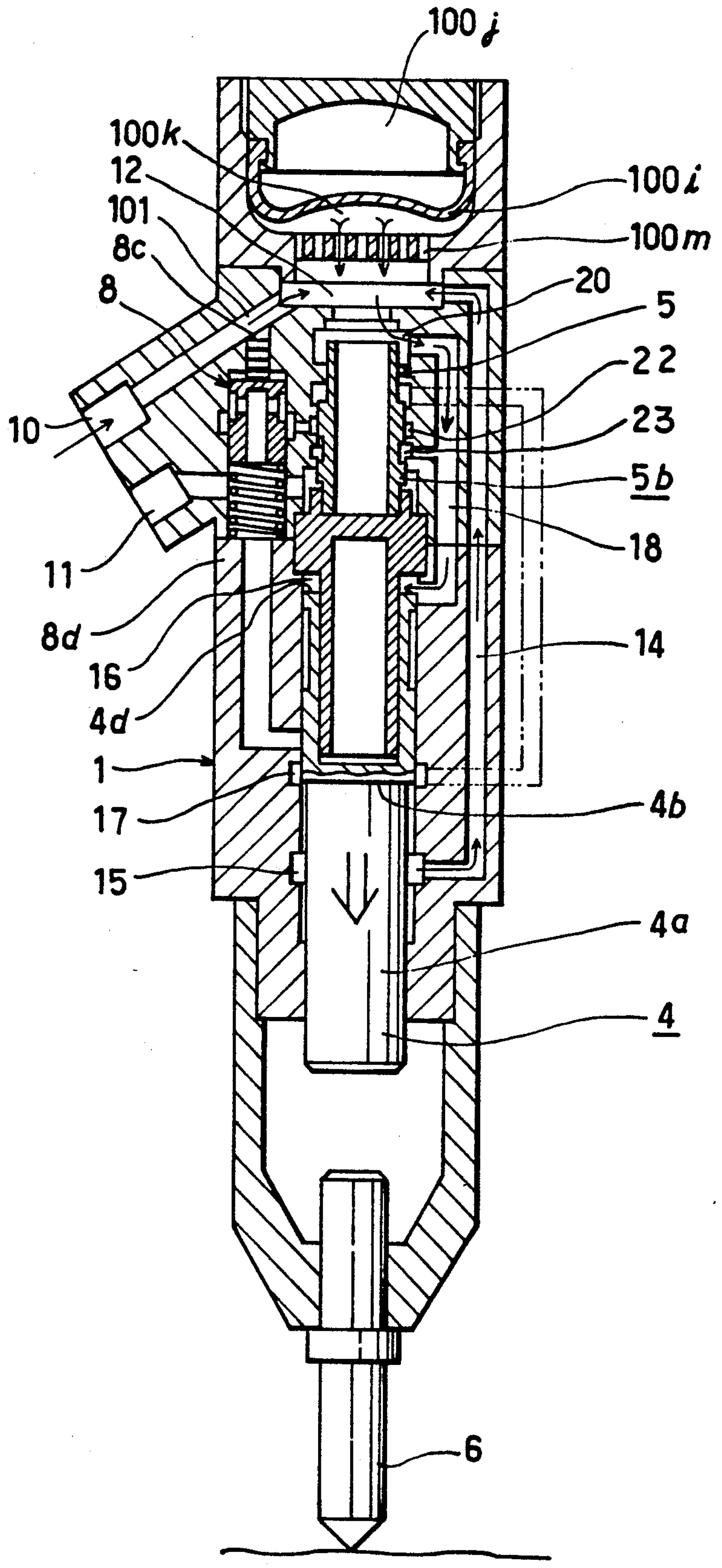
FIG. 5 is a sectional view showing the acceleration of hammer piston in the first embodiment.
Figure 10:
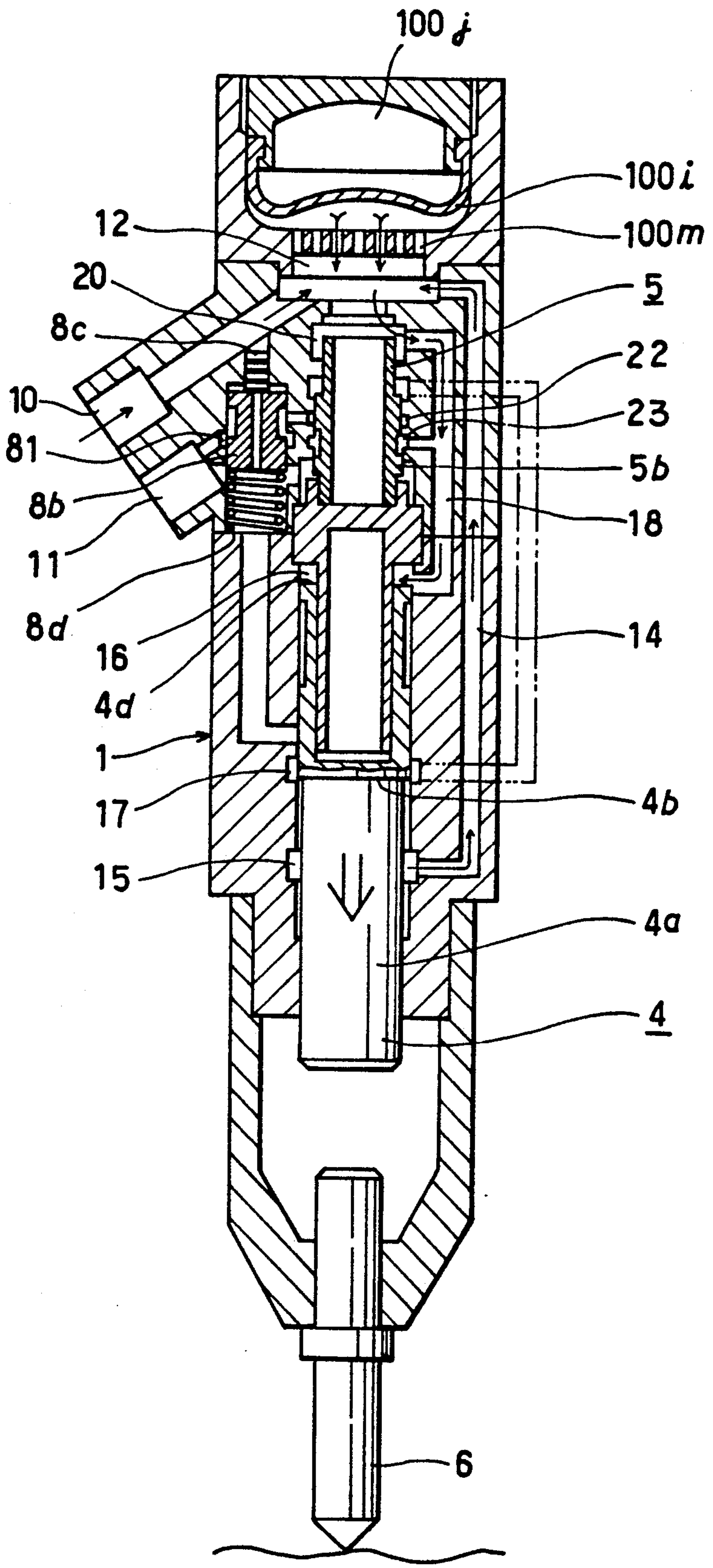
FIG. 10 is a sectional view showing the acceleration of the hammer piston in the second embodiment.

When the valve body 5*b* of the control valve 5 is lowered as mentioned above, the upper chamber 12 and first valve chamber 20 are communicated with each other as shown in FIGS. 5 and 10. Simultaneously therewith, the first land section 51 of the valve body 5*b* interrupts the communication between the third valve chamber 22 and the fourth valve chamber 23. Thus, the hydraulic fluid under high pressure in the upper chamber 12 flows from the first valve chamber 20 into the upper piston chamber 16 via the second passage 18. Since the area of the upper pressure receiving face 4*d* staying in the upper piston chamber 16 is much larger than that of the lower pressure receiving face 4*b* staying near the intermediate piston chamber 17, the difference in area between the upper and lower pressure receiving faces causes the hammer piston 4 to fall as abruptly accelerated. Then the hydraulic fluid in the lower piston chamber 15 is ejected and flows reversely from the clearance between the outer circumference of the rod section 4*a* and the through-hole 100*a* into the upper chamber 12 via the first passage 14.

Figure 6:
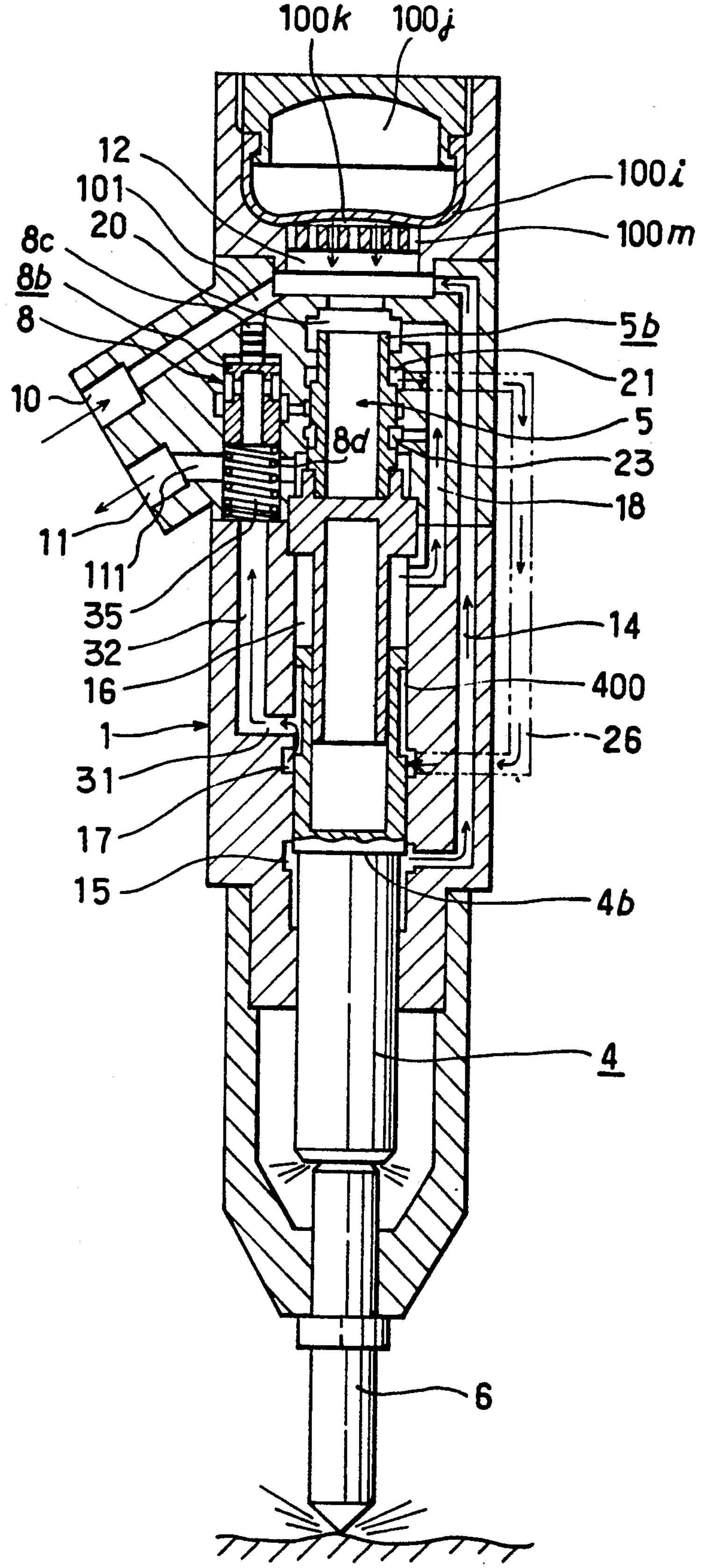
FIG. 6 is a sectional view showing the striking in the first embodiment.
Figure 11:
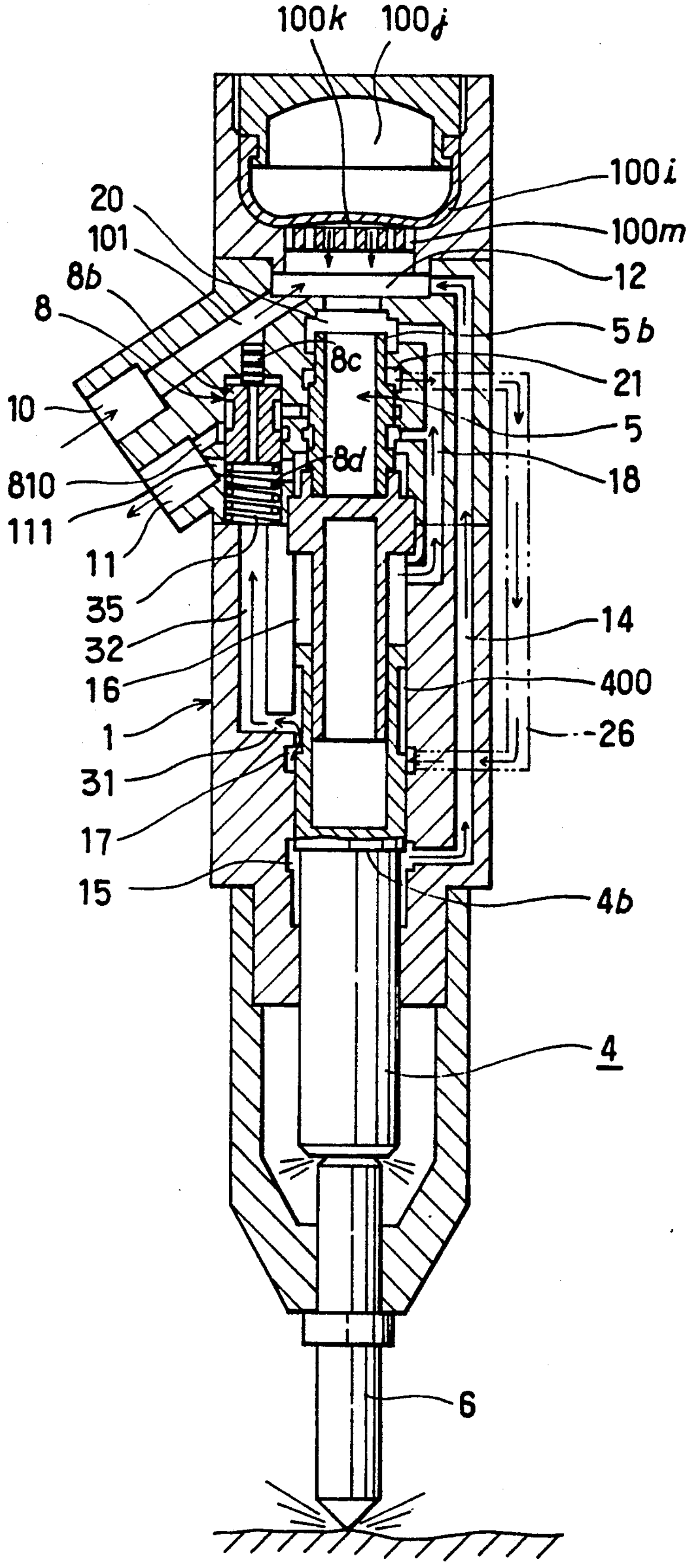
FIG. 11 is a sectional view showing the striking in the second embodiment.

When the hammer piston 4 starts the falling stroke, the hydraulic fluid accumulated under pressure in the accumulation chamber 100*k* of the accumulator is discharged through the small hole 100*m*, and its high pressure is supplied to the upper piston chamber 16 through the first valve chamber 20 and the second passage 18 to compensate the pressure in the high pressure circuit. Thus, the hammer piston 4 falls suddenly and strikes the head of the tool 6 as shown in FIGS. 6 and 11. The tool 6 transmits this striking force to a concrete or the similar object, and crushes it.

When the hammer piston 4 falls down to the striking point, the lower pressure receiving face 4*b* of the hammer piston 4 reaches the lower piston chamber 15 while the ring-like recess 400 of the hammer piston 4 reaches the intermediate piston chamber 17. Thus, the intermediate piston chamber 17 is communicated with the fourth passage 32 via the ring-like recess 400.

As the result, the second valve chamber 21 of the control valve 5 is connected to the outlet 11 along a route including the third passage 26, the intermediate piston chamber 18, the fourth passage 32, the lower chamber 35 and the outlet passage 111 in this order as indicated with the arrow in FIGS. 6 and 11. Thus, the second valve chamber 21 of the control valve 5 has a low pressure PL, and a force acts on and pushes up the control valve 5.

Namely, a high pressure PH is always acting on the areas A1 and A2. When the low pressure PL acts on the second valve chamber 21 (area A3), a force FU acts on and raises the control valve 5.

The lifting force FU is expressed as follows:

$$FU = PH \times A2 + PL \times A4 - PH \times A1 - PL \times A3 = PH(A2 - A1) - PL(A3 - A4)$$

By placing the equation (32) in this expression, $$= PH(A2 - A1) - PL(A2 - A1) = (PH - PL)(A2 - A1) > 0$$

The lifting force FU causes the control valve 5 to be raised. When the control valve 5 is lifted, the position shown in FIG. 1 is restored, and the hammer piston 4 will resume rising. Thereafter the same operation is repeatedly done to keep striking the tool 6.

The operating pressure of the hydraulic striking device is the pressure in the upper chamber 12 shown in FIGS. 2 and 8. When the flow rate of the hydraulic fluid supplied to the inlet 10 is low, the pressure in the upper chamber 12 becomes low as mentioned above. Higher flow rate of the hydraulic fluid will result in a higher pressure in the upper chamber 12.

As mentioned above, the hammer piston 4 is raised under the pressure of the hydraulic fluid supplied into the lower piston chamber 15. At the same time, the hydraulic fluid in the upper piston chamber 16 is forced out and passes from the second passage 18 to the adjusting valve 8 through the fourth and third valve chambers 23 and 22 as well as through the liaison hole 812.

The adjusting valve 8 incorporates the valve body 8*b* supported from below on the spring 8*d*. Because communicated with each other through the vertical hole 83 and the hole 830 (in the first embodiment) formed in the valve body 8*b*, or the vertical hole 83 formed in the valve body 8*b* (in the second embodiment), the upper and lower chambers 36 and 35 of the adjusting valve 8 are kept at a nearly same pressure. Since the lower chamber 35 communicates directly with the outlet passage 111, the pressure in this lower chamber 35 is low. Also, since the upper end of the plunger 8*c* touching the ceiling face of the valve body 8*b* faces the inlet passage 101 located near the upper chamber 12, a pressure equivalent to that in the upper chamber 12 acts on the plunger 8*c*.

On the other hand, since the upper chamber 12 and the lower piston chamber 15 are connected directly to each other through the first passage 14, the pressures in these chambers are nearly equal to each other. The pressure in the lower piston chamber 15 corresponds to a product of the pressure P of the hydraulic fluid ejected from the upper piston chamber 16 by the ratio in area between the upper and lower piston chambers.

The hydraulic fluid ejected from the upper piston chamber 16 is passed through the second passage 18, the fourth valve chamber 23 and the third valve chamber 22 of the control valve 5 to the liaison passes 812 as having previously been described. In the first embodiment, when the hydraulic fluid is supplied from the control chamber 81 into the valve hole portion 813 above the chamber 81, its flow is restricted between the lower end 821 of the rod section 82 and the upper edge of the control chamber 81, and the flow thus controlled is discharged to the outlet passage 111 through the hole 820, the vertical hole 83 and the lower chamber 35 in this order. In the second embodiment, when the hydraulic fluid flows out via the control chamber 81 after supplied from the liaison hole 812 into the valve hole portion 813, its flows is restricted between the lower end 821 of the rod section 82 and the upper edge of the control chamber 81, and the flow thus controlled flows from the passage 810 to the outlet 11.

In any way, the pressure in the upper piston chamber 16 depends upon the restriction of the hydraulic fluid flow between the lower end 821 of the rod section 82 and the upper edge of the control chamber 81. The extent of this flow restriction (area of the opening between the valve hole portion 813 and the control chamber 81) is determined by the balance between the force lifting the valve body **8*b* as the plunger 8*c* is lowered under a pressure from the inlet passage 101 that is nearly equal to the pressure in the upper chamber 12, and the force pushing down the spring 8*d***.

Since the force to the plunger **8*c* increases as the pressure in the upper chamber 12 rises, the valve body 8*b* is forced down against the action of the spring 8*d* and so the lower end 821 of the rod section 82 falls. Thus the area of the above-mentioned opening increases so that the fluid flow is less restricted. Therefore, the hydraulic fluid flow discharged from the upper piston chamber 16 to the outlet 11 increases while the pressure in the upper piston chamber 16 lowers. On the other hand, as the valve body 8*b* is forced up by the spring 8*d* when the pressure in the upper chamber 12 falls, the lower end 821 of the rod section 82 rises and the area of the opening decreases, thus the flow is more restricted. As the result, the pressure in the upper piston chamber 16** rises.

The ratio in area between the upper and lower piston chambers 16 and 15 is normally set to 3 to 5. In view of the balance of the hydraulic pressures exerted on the hammer piston 4, a product of the pressure in the upper piston chamber 16 by the area ratio corresponds to the pressure in the lower piston chamber 15. Hence, when the pressure in the upper piston chamber 16 decreases as mentioned above, the pressure in the lower piston chamber 15 automatically falls. Rise of the pressure in the upper piston chamber 16 leads to automatic rise of the pressure in the lower piston chamber 15.

As seen from the foregoing description, the pressure in the lower piston chamber 15 can be controlled through the control of the pressure in the upper piston chamber 16. Therefore, when the pressures in the upper and lower piston chambers 16 and 15 are kept nearly constant under the aforementioned action of the adjusting valve 8, the pressure in the upper chamber 12 is also maintained generally constant. So, even when the flow rate of the hydraulic fluid coming from the inlet 10 varies, the operating pressure of the hydraulic striking device is automatically made nearly constant, thus it is not necessary to adjust the discharge of the hydraulic pressure source of a machine which supplies the hydraulic fluid to the inlet 10.

Since the operating pressure of the hydraulic striking device can automatically be controlled to a predetermined level by the adjusting valve, the device can be operated very easily without the necessity of any complicated flow rate adjustment at the hydraulic pressure source of a hydraulic construction machine, etc. with which the device is used in conjunction. Thus, the hydraulic striking device according to the present invention can be operated for the jobs of crushing, destruction, etc. by freely using the hydraulic pressure supplied from the hydraulic pressure source of a variety of hydraulic construction machines, etc.

What is claimed is:

1. A hydraulic striking device comprising a main body (1) having disposed coaxially therein a tool (6), a hammer piston (4) which drives said tool (6) and a control valve (5) which selects a flow passage of hydraulic fluid to said hammer piston (4), i. said main body (1) having above the control valve (5) an upper chamber (12) which always communicates with a hydraulic pressure inlet (10) and a lower piston chamber (15) in which the lower pressure receiving face (**4*b*) of said hammer piston (4) stays, through a first passage (14**);

ii. there being provided between said upper chamber (12) and lower piston chamber (15) an upper piston chamber (16) in which the upper pressure receiving face (**4*d*) of said hammer piston (4) always stays and which communicates with said upper chamber (12) through a second passage (18) when the valve body (5*b*) of said control valve (5) goes down; and iii. there being disposed near said control valve (5) an operating pressure adjusting valve (8) which automatically restricts the flow of hydraulic fluid to an outlet (11) through said second passage (18) from said upper piston chamber (16) correspondingly to the pressure of the hydraulic fluid coming into said upper chamber (12), thereby controlling the pressure in said upper piston chamber (16**).

2. A hydraulic striking device of claim 1, wherein said adjusting valve (8) is provided with a valve hole (**8*a*) formed in a position where it intersects both an inlet passage (101) for communication between said inlet (10) and upper chamber (12) and an outlet passage (111) communicating said outlet (11) and a low pressure chamber (24) of the control valve (5) with each other, a valve body (8*b*) slidably disposed in said valve hole (8*a*), a spring (8*d*) which forces up the valve body (8*b*), and a plunger (8*c*) which conveys the pressure of the hydraulic fluid passed through said inlet passage (101) to said valve body (8*b*) which is thus forced down against the action of said spring (8*d*), said valve hole (8*a*) having a ring-like control chamber (81) into which the hydraulic fluid is led from said upper piston chamber (16), said valve body (8*b*) being provided with a flow restrictor in a position corresponding to said control chamber (81**).

3. A hydraulic striking device of claim 2, wherein said control chamber (81) is provided in the middle of the depth of said valve hole (8*a*) and always communicated with a liaison hole (812) of which the communication with said upper piston chamber (16) is switched according to the changeover operation of said control valve (5), said valve body (8*b*) has a vertical hole (83) formed in the center thereof and also has along the outer circumference thereof a rod section (82) extending from a valve hole portion (813) above said control chamber (81) to inside said control chamber (81) and which has a hole (820) communicating with said vertical hole (83), and there is located at the lower end of said rod section (82) a flow restrictor which variably restricts the amount of the fluid flowing into said valve hole portion (813) from said control chamber (81) as said valve body (8*b*) is changed in position.

4. A hydraulic striking device of claim 2, wherein said control chamber (81) is provided in the middle of the depth of said valve hole (8*a*), said control chamber (81) is communicated with said outlet (11) through said outlet passage (111) and another passage (810), a valve hole portion (813) above said control chamber (81) always communicates with a liaison hole (812) of which the communication with said upper piston chamber (16) is switched according to the changeover operation of said control valve (5), said valve body (8*b*) has a rod section (82) extending from a valve hole portion (813) to said control chamber (81), and there is provided at the lower end of said rod section (82) a flow restrictor which variably restricts the amount of the fluid flowing from said valve hole portion (813) into said control chamber (81) as said valve body (8*b*) is changed in position.

5. A hydraulic striking device of claim 2, wherein said valve hole (8*a*) is made as a blind hole, a through-hole (80) is provided as led from the ceiling of the blind hole to said inlet passage (101), and said plunger (8*c*) is fitted in said through-hole (80).

6. A hydraulic striking device of claim 2, wherein there is always formed at said valve hole portion above the top of said valve body (8*b*) pressed by said spring (8*d*) a clearance (36) which communicates with a lower chamber (35) in which said spring (8*d*) is disposed and of which the bottom is communicated through a passage (32) with a hole defined between said upper piston chamber (16) and said lower piston chamber (15) in which said hammer piston (4) slides.

7. A hydraulic striking device of claim 1, wherein said main body (1) has formed on the center line thereof a through-hole (100*a*) in which said hammer piston (4) is slidably fitted, said hammer piston (4) has a rod section (4*a*) and a piston section (4*c*) on the outer circumference of which a ring-like recess (400) is formed, said through-hole (100*a*) is closed at the upper end thereof with a sealing member (2) having a guide shaft (2*a*) on which said piston section (4*c*) is fitted, said upper piston chamber (16) is formed between an upper pressure receiving face (4*d*) atop said piston section (4*c*) and a head (2*b*) of said sealing member (2), said lower piston chamber (15) is formed as a ring-like recess in said through-hole (100*a*), said control valve (5) is provided with a valve hole (5*a*) of which the bottom is the head (2*b*) of said sealing member (2) and a cylindrical valve body (5*b*) slidably fitted in said valve hole (5*a*), said valve body (5*b*) has a first rod section (50), a first land section (51), a second rod section (52), a second land section (53) and a third rod section (54) in this order from above, said valve hole (5*a*) has a first valve chamber (20) communicating with said upper chamber (12) and also has formed below said first valve chamber (20) a second valve chamber (21), a third valve chamber (22), a fourth valve chamber (23) and a low pressure chamber (24) in this order as spaced from each other, said first valve chamber (20) being connected to said upper piston chamber (16) through said second passage (18) and having the communication with said upper chamber (12) interrupted by said first rod section (50) when said valve body (5*b*) goes up, said second valve chamber (21) being connected through a third passage (26) to an intermediate piston chamber (17) provided in a position between said upper piston chamber (16) and said lower piston chamber (15), said third valve chamber (22) communicating with said fourth valve chamber (23) through said second land section (52) when said valve body (5*b*) goes up and having the communication with said fourth valve chamber (23) interrupted by said land section (51) when said valve body (5*b*) goes down, said third valve chamber (22) being connected to said second passage (18) through a shunt passage (19), said low pressure chamber (24) being located so as to surround said third rod section (54) and having the communication with said fourth valve chamber (23) interrupted by said second land section (53) wherever said valve body (5*b*) is.

* * * * *